United States Patent
Lorenz et al.

(10) Patent No.: US 11,768,829 B2
(45) Date of Patent: Sep. 26, 2023

(54) METHOD AND SYSTEM FOR PRE-POSITIONING DATA

(71) Applicant: JPMorgan Chase Bank, N.A., New York, NY (US)

(72) Inventors: Timothy Lorenz, Lewis Center, OH (US); Peter G Costanzo, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/448,470

(22) Filed: Sep. 22, 2021

(65) Prior Publication Data

US 2023/0091291 A1    Mar. 23, 2023

(51) Int. Cl.
*G06F 16/00* (2019.01)
*G06F 16/23* (2019.01)
*G06F 16/29* (2019.01)

(52) U.S. Cl.
CPC .......... *G06F 16/2379* (2019.01); *G06F 16/29* (2019.01)

(58) Field of Classification Search
CPC .............................. G06F 16/2379; G06F 16/29
See application file for complete search history.

(56) References Cited

U.S. PATENT DOCUMENTS

| | | | |
|---|---|---|---|
| 2010/0281179 A1* | 11/2010 | Istavan | H04N 21/25891 707/752 |
| 2013/0046831 A1* | 2/2013 | Schultz | G06F 16/972 709/204 |
| 2013/0066936 A1* | 3/2013 | Krishnan | H04L 67/5681 709/201 |
| 2015/0245160 A1* | 8/2015 | Agrawal | H04L 41/145 455/406 |
| 2017/0315917 A1* | 11/2017 | Yamamoto | G06F 12/0862 |

* cited by examiner

*Primary Examiner* — Dinku W Gebresenbet
(74) *Attorney, Agent, or Firm* — GREENBLUM & BERNSTEIN P.L.C.

(57) ABSTRACT

A method for pre-positioning data based on a user attribute is disclosed. The method includes retrieving audit information that corresponds to a user, the audit information including the user attribute; determining, by using a model, a user characteristic for the user based on the audit information, the user characteristic including a probability value and a geographical location; comparing the user characteristic with a predetermined threshold; identifying raw data from a networked platform, the raw data corresponding to the user; generating a structured data set for the user based on the user characteristic; and persisting the structured data set in an edge computing repository based on a result of the comparing, the edge computing repository corresponding to the geographical location.

18 Claims, 7 Drawing Sheets

FIG. 7

METHOD AND SYSTEM FOR PRE-POSITIONING DATA

BACKGROUND

1. Field of the Disclosure

This technology generally relates to methods and systems for data positioning, and more particularly to methods and systems for pre-positioning user data at edge computing repositories based on predicted user access patterns.

2. Background Information

Many business entities operate expansive enterprise networks which provide services to many users in different geographical locations. Often, local points of presence are required to facilitate local data access and improve user experience for common activities such as, for example, initiating a communication session to retrieve user data. Historically, implementation of conventional data storage techniques has resulted in varying degrees of success with respect to user experience, cost, and processing time.

One drawback of using convention data storage techniques is that in many instances, the requested user data are centrally stored in geographically distant locations. As a result, the local points of presence must retrieve the requested user data from remote systems, which adds latency to the data transaction and adversely affects user experience. Inversely, storing all the user data at each local point of presence on the off chance that a user may request a small portion of the user data results in unnecessary network bandwidth and storage costs.

Therefore, there is a need to pre-position the user data at edge computing repositories based on predicted user access patterns to enable tuning of network performance and data availability concerns against network bandwidth and data storage costs.

SUMMARY

The present disclosure, through one or more of its various aspects, embodiments, and/or specific features or sub-components, provides, inter alia, various systems, servers, devices, methods, media, programs, and platforms for pre-positioning user data at edge computing repositories based on predicted user access patterns.

According to an aspect of the present disclosure, a method for pre-positioning data based on at least one user attribute is disclosed. The method is implemented by at least one processor. The method may include retrieving audit information that corresponds to at least one user, the audit information may include the at least one user attribute; determining, by using at least one model, at least one user characteristic for each of the at least one user based on the audit information, the at least one user characteristic may include at least one from among a probability value and a geographical location; comparing the at least one user characteristic with at least one predetermined threshold; identifying raw data from at least one platform, the raw data may correspond to the at least one user; generating, from the raw data, a structured data set for each of the at least one user based on the at least one user characteristic; and persisting the structured data set in an edge computing repository based on a result of the comparing, the edge computing repository may correspond to the geographical location.

In accordance with an exemplary embodiment, the at least one user attribute may include information that relates to at least one from among a user geographical location and a user access time, the user access time may relate to a user activity history for a predetermined period.

In accordance with an exemplary embodiment, the probability value may correspond to a likelihood that the user will initiate a communication session from the geographical location, the communication session may relate to an interactive information interchange between at least two communicating devices.

In accordance with an exemplary embodiment, the method may further include receiving, via an application programming interface, at least one request from the at least one user; identifying the corresponding structured data set in the edge computing repository based on the at least one request; providing, to the at least one user, the corresponding structured data set in response to the at least one request; and updating the audit information with data that relates to the at least one request.

In accordance with an exemplary embodiment, to determine the at least one user characteristic, the method may further include extracting historical data from the audit information; determining, by using the at least one model, a predicted access pattern for each of the at least one user based on the historical data; determining the probability value for each of the at least one user based on the corresponding predicted access pattern; and determining the geographical location for each of the at least one user based on the corresponding predicted access pattern.

In accordance with an exemplary embodiment, the historical data may include information that relates to at least one from among pay day information, holiday information, day of the week information, and account creation information.

In accordance with an exemplary embodiment, to generate the structured data set, the method may further include identifying a preferred data format for the at least one user by using the at least one user characteristic, the preferred data format may relate to a device of the at least one user; mapping at least one data element in the raw data to the preferred data format; and generating the structured data set based on a result of the mapping.

In accordance with an exemplary embodiment, the structured data set may be persisted in the edge computing repository when the at least one user characteristic is greater than the at least one predetermined threshold.

In accordance with an exemplary embodiment, the structured data set may be removed from the edge computing repository when the at least one user characteristic is less than the at least one predetermined threshold.

In accordance with an exemplary embodiment, the at least one model may include at least one from among a machine learning model, a statistical model, a mathematical model, a process model, and a data model.

According to an aspect of the present disclosure, a computing device configured to implement an execution of a method for pre-positioning data based on at least one user attribute is disclosed. The computing device comprising a processor; a memory; and a communication interface coupled to each of the processor and the memory, wherein the processor may be configured to retrieve audit information that corresponds to at least one user, the audit information may include the at least one user attribute; determine, by using at least one model, at least one user characteristic for each of the at least one user based on the audit information, the at least one user characteristic may include at least one from among a probability value and a geographical location; compare the at least one user characteristic with at least one predetermined threshold; identify raw data from at least one platform, the raw data may correspond to the at least one user; generate, from the raw data, a structured data set for each of the at least one user based on the at least one user characteristic; and persist the structured data set in an edge computing repository based on a result of the comparing, the edge computing repository may correspond to the geographical location.

In accordance with an exemplary embodiment, the at least one user attribute may include information that relates to at least one from among a user geographical location and a user access time, the user access time may relate to a user activity history for a predetermined period.

In accordance with an exemplary embodiment, the probability value may correspond to a likelihood that the user will initiate a communication session from the geographical location, the communication session may relate to an interactive information interchange between at least two communicating devices.

In accordance with an exemplary embodiment, the processor may be further configured to receive, via an application programming interface, at least one request from the at least one user; identify the corresponding structured data set in the edge computing repository based on the at least one request; provide, to the at least one user, the corresponding structured data set in response to the at least one request; and update the audit information with data that relates to the at least one request.

In accordance with an exemplary embodiment, to determine the at least one user characteristic, the processor may be further configured to extract historical data from the audit information; determine, by using the at least one model, a predicted access pattern for each of the at least one user based on the historical data; determine the probability value for each of the at least one user based on the corresponding predicted access pattern; and determine the geographical location for each of the at least one user based on the corresponding predicted access pattern.

In accordance with an exemplary embodiment, the historical data may include information that relates to at least one from among pay day information, holiday information, day of the week information, and account creation information.

In accordance with an exemplary embodiment, to generate the structured data set, the processor may be further configured to identify a preferred data format for the at least one user by using the at least one user characteristic, the preferred data format may relate to a device of the at least one user; map at least one data element in the raw data to the preferred data format; and generate the structured data set based on a result of the mapping.

In accordance with an exemplary embodiment, the processor may be further configured to persist the structured data set in the edge computing repository when the at least one user characteristic is greater than the at least one predetermined threshold.

In accordance with an exemplary embodiment, the processor may be further configured to remove the structured data set from the edge computing repository when the at least one user characteristic is less than the at least one predetermined threshold.

In accordance with an exemplary embodiment, the at least one model may include at least one from among a machine learning model, a statistical model, a mathematical model, a process model, and a data model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
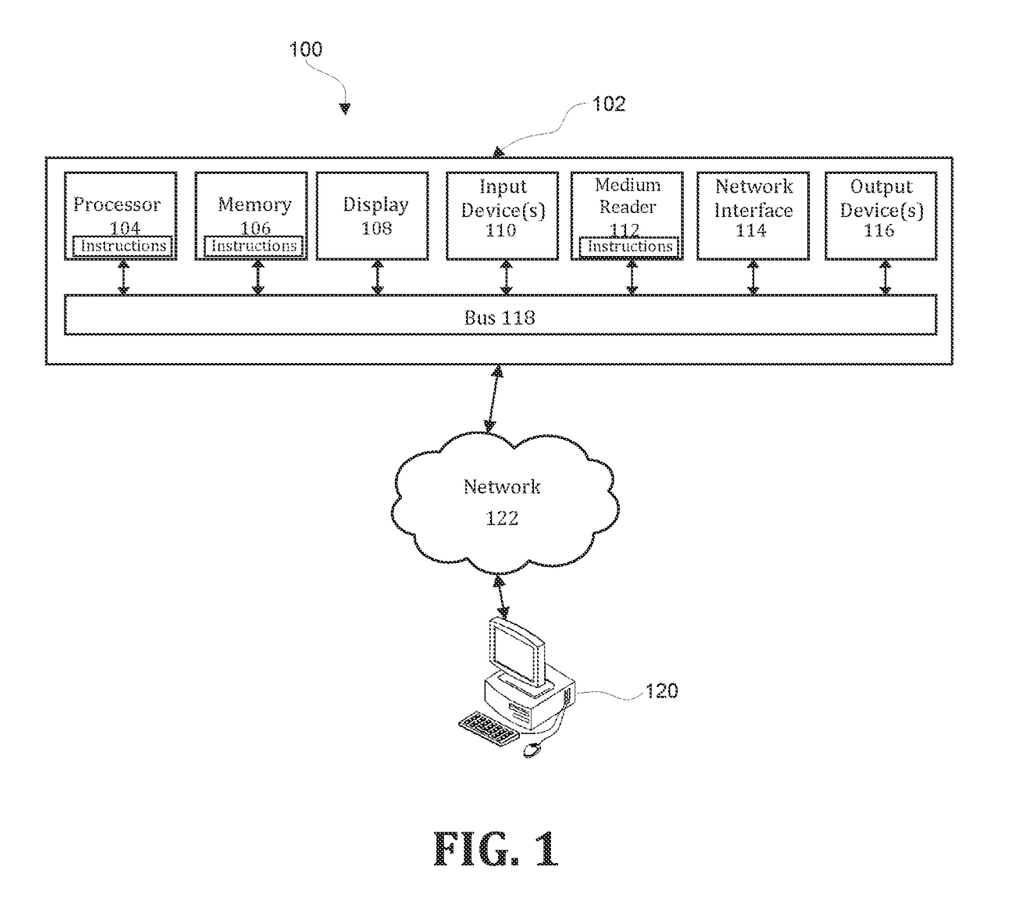
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed)

network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for pre-positioning user data at edge computing repositories based on predicted user access patterns.

Figure 2:
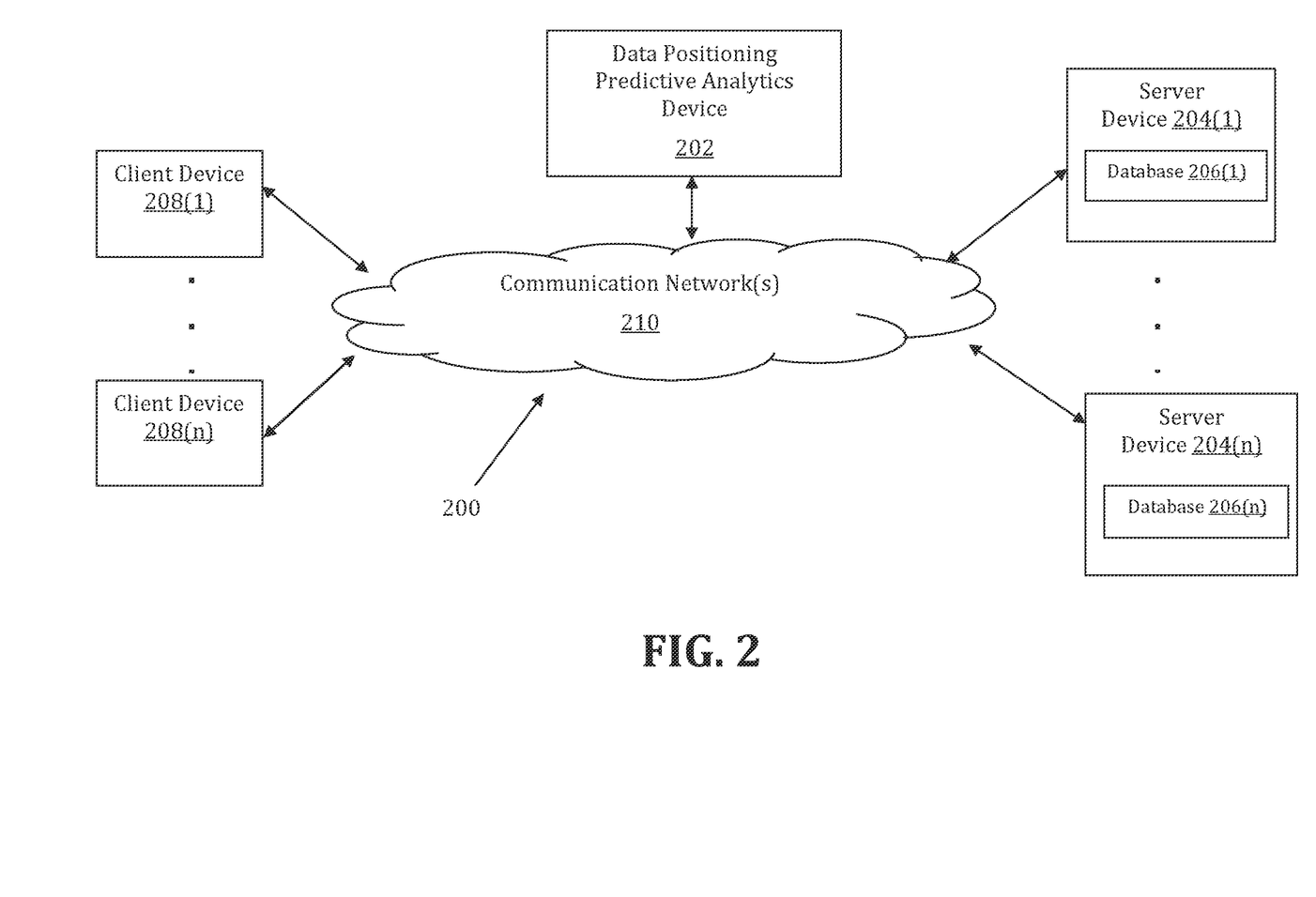
FIG. 2 illustrates an exemplary diagram of a network environment.

Referring to FIG. 2, a schematic of an exemplary network environment 200 for implementing a method for pre-positioning user data at edge computing repositories based on predicted user access patterns is illustrated. In an exemplary embodiment, the method is executable on any networked computer platform, such as, for example, a personal computer (PC).

The method for pre-positioning user data at edge computing repositories based on predicted user access patterns may be implemented by a Data Positioning Predictive Analytics (DPPA) device 202. The DPPA device 202 may be the same or similar to the computer system 102 as described with respect to FIG. 1. The DPPA device 202 may store one or more applications that can include executable instructions that, when executed by the DPPA device 202, cause the DPPA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DPPA device 202 itself, may be located in virtual server(s) running in a cloud-based computing environment rather than being tied to one or more specific physical network computing devices. Also, the application(s) may be running in one or more virtual machines (VMs) executing on the DPPA device 202. Additionally, in one or more embodiments of this technology, virtual machine(s) running on the DPPA device 202 may be managed or supervised by a hypervisor.

In the network environment 200 of FIG. 2, the DPPA device 202 is coupled to a plurality of server devices 204(1)-204(n) that hosts a plurality of databases 206(1)-206(n), and also to a plurality of client devices 208(1)-208(n) via communication network(s) 210. A communication interface of the DPPA device 202, such as the network interface 114 of the computer system 102 of FIG. 1, operatively couples and communicates between the DPPA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DPPA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DPPA devices that efficiently implement a method for pre-positioning user data at edge computing repositories based on predicted user access patterns.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DPPA device 202 may be a standalone device or integrated with one or more other devices or apparatuses, such as one or more of the server devices 204(1)-204(n), for example. In one particular example, the DPPA device 202 may include or be hosted by one of the server devices 204(1)-204(n), and other arrangements are also possible. Moreover, one or more of the devices of the DPPA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DPPA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to audit information, user attributes, machine learning models, user characteristics, probability values, geographical location information, predetermined thresholds, raw data, and structured data sets.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DPPA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DPPA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DPPA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DPPA device 202, the server devices 204(1)-204(n), or the client devices 208(1)-208(n), for example, may be configured to operate as virtual instances on the same physical machine. In other words, one or more of the DPPA device 202, the server devices 204(1)-204(n), or the client devices 208(1)-208(n) may operate on the same physical device rather than as separate devices communicating through communication network(s) 210. Additionally, there may be more or fewer DPPA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
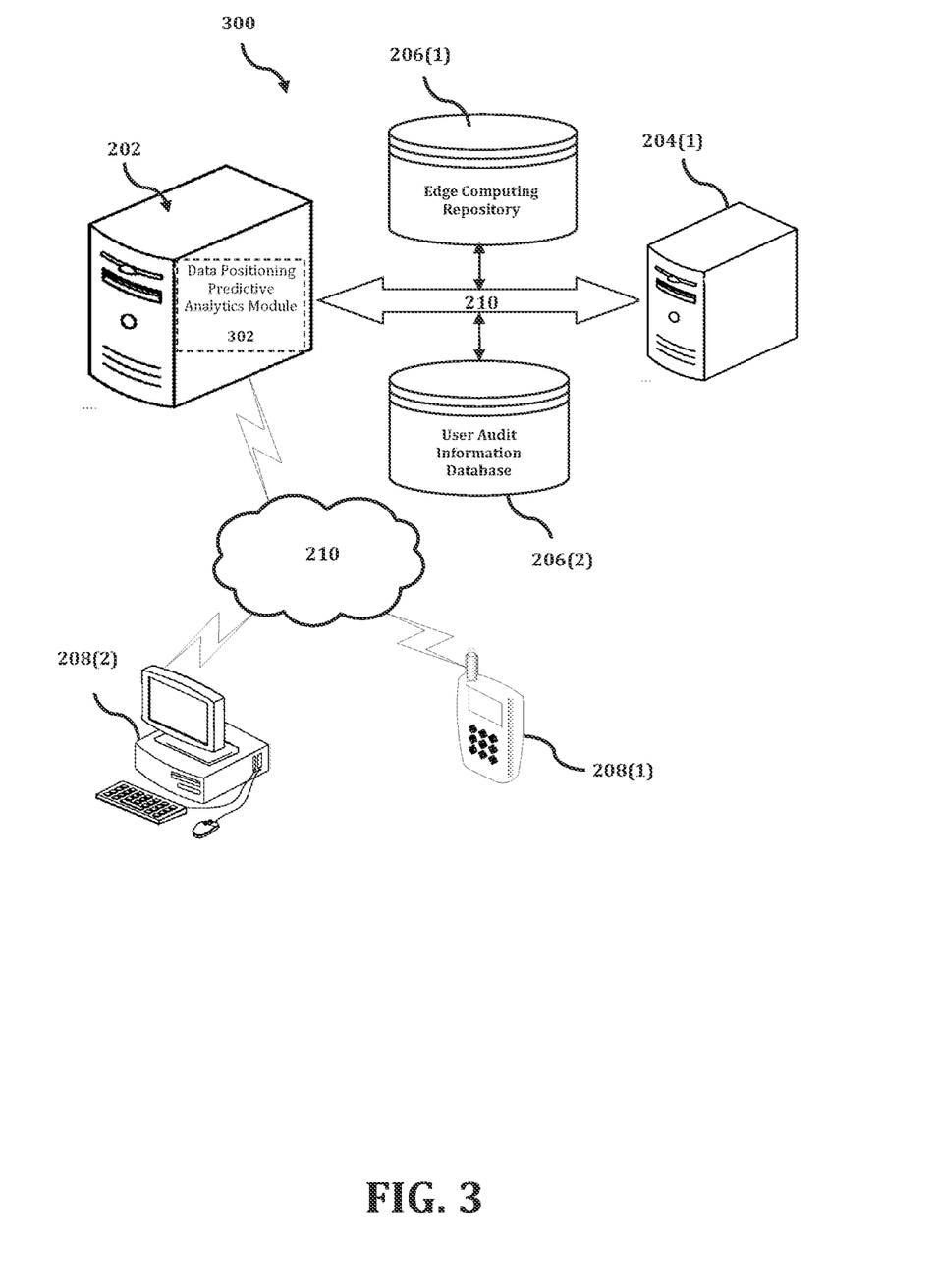
FIG. 3 shows an exemplary system for implementing a method for pre-positioning user data at edge computing repositories based on predicted user access patterns.

The DPPA device 202 is described and shown in FIG. 3 as including a data positioning predictive analytics module 302, although it may include other rules, policies, modules, databases, or applications, for example. As will be described below, the data positioning predictive analytics module 302 is configured to implement a method for pre-positioning user data at edge computing repositories based on predicted user access patterns.

An exemplary process 300 for implementing a mechanism for pre-positioning user data at edge computing repositories based on predicted user access patterns by utilizing the network environment of FIG. 2 is shown as being executed in FIG. 3. Specifically, a first client device 208(1) and a second client device 208(2) are illustrated as being in communication with DPPA device 202. In this regard, the first client device 208(1) and the second client device 208(2) may be "clients" of the DPPA device 202 and are described herein as such. Nevertheless, it is to be known and understood that the first client device 208(1) and/or the second client device 208(2) need not necessarily be "clients" of the DPPA device 202, or any entity described in association therewith herein. Any additional or alternative relationship may exist between either or both of the first client device 208(1) and the second client device 208(2) and the DPPA device 202, or no relationship may exist.

Further, DPPA device 202 is illustrated as being able to access an edge computing repository 206(1) and a user audit information database 206(2). The data positioning predictive analytics module 302 may be configured to access these databases for implementing a method for pre-positioning user data at edge computing repositories based on predicted user access patterns.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DPPA device 202 via broadband or cellular communication. Of course, these embodiments are merely exemplary and are not limiting or exhaustive.

Upon being started, the data positioning predictive analytics module 302 executes a process for pre-positioning user data at edge computing repositories based on predicted user access patterns. An exemplary process for pre-positioning user data at edge computing repositories based on predicted user access patterns is generally indicated at flowchart 400 in FIG. 4.

Figure 4:
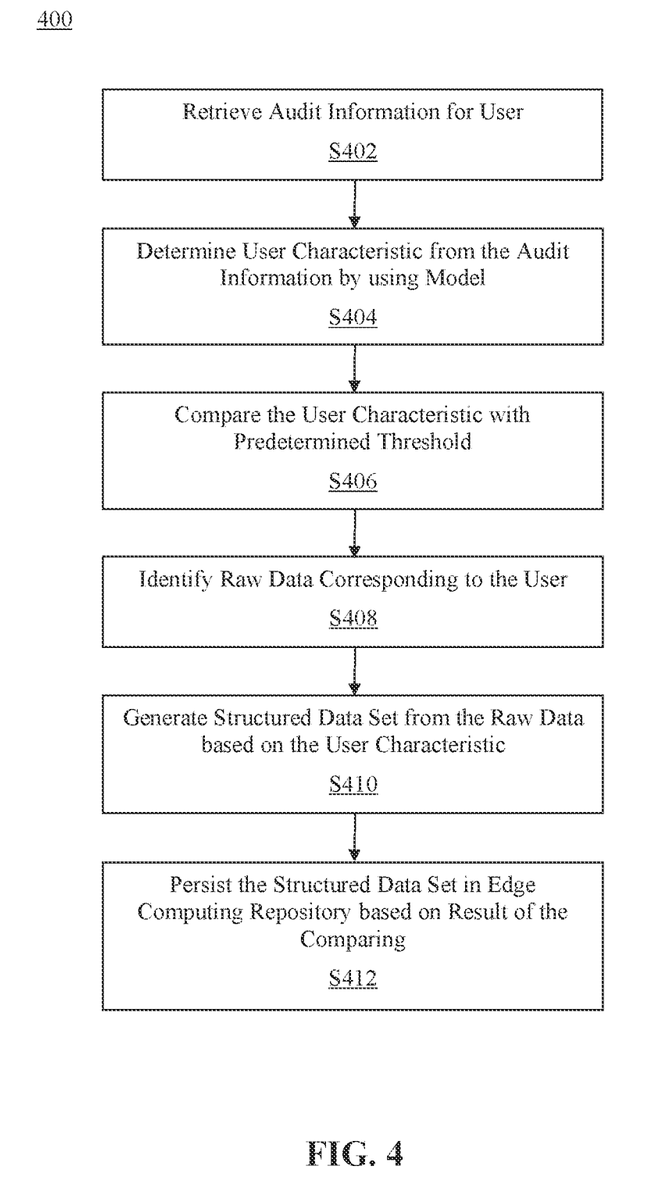
FIG. 4 is a flowchart of an exemplary process for implementing a method for pre-positioning user data at edge computing repositories based on predicted user access patterns.

In the process 400 of FIG. 4, at step S402, audit information that corresponds to a user may be retrieved. The audit information may include a user attribute. In an exemplary embodiment, the user attribute may include information that relates to at least one from among a user geographical location and a user access time. The user access time may relate to a user activity history for a predetermined period. For example, the audit information may include login information for the user, which includes a geographical location that the user logged in from and a time of the log in.

In another exemplary embodiment, the audit information may include supplemental user information that relates to a current state of the user when the user activity has occurred. The supplemental user information may include at least one from among pay day information, holiday information, day of the week information, and account creation information. For example, the supplemental user information may indicate that the user frequently initiates a communication session to check an account balance on pay day.

In another exemplary embodiment, the audit information may be retrieved from a variety of client interaction platforms. The audit information may be processed into a compatible data format prior to retrieval. Similarly, the audit information may be processed into a compatible data format after retrieval. For example, the audit information may be identified from a user activity log and extracted for processing consistent with disclosures in the present application. As will be appreciated by a person of ordinary skill in the art, the processing of the audit information into a compatible data format enables system agnostic integration of the claimed invention with a variety of platforms.

At step S404, a user characteristic for the user may be determined based on the audit information by using a model. The user characteristic may include at least one from among a probability value and a geographical location. In an exemplary embodiment, the probability value may correspond to a likelihood that the user will initiate a communication session from the geographical location. The communication session may relate to an interactive information interchange between at least two communicating devices. For example, the probability value may indicate that there is a seventy percent chance that the user will log in at the geographical location in the future.

In another exemplary embodiment, the probability value may include a projected timeline that relates to the likelihood of a user action. The timeline may be predetermined based on at least one from among an administrator preference and a business guideline. For example, the probability value may indicate that there is a seventy percent chance that the user will log in at the geographical location in the next twenty-four to forty-eight hours. In another exemplary embodiment, the geographical location may relate to a position of the user on the earth. The geographical location may include an absolute location as defined by coordinates such as, for example, latitude and longitude. The geographical location may also include an approximate location as defined by a relative distance to a major populated area such as, for example, a city.

In another exemplary embodiment, determining the user characteristic may include extracting historical data from the audit information. The historical data may include information that relates to at least one from among pay day information, holiday information, day of the week information, and account creation information. A predicted access pattern for the user may be determined based on the historical data by using the model. Then, the probability value for the user may be determined based on the corresponding predicted access pattern. Similarly, the geographical location for the user may be determined based on the corresponding predicted access pattern.

In another exemplary embodiment, the model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S406, the user characteristic may be compared with a predetermined threshold. The user characteristic may be compared with the predetermined threshold to facilitate active control of data positioning consistent with disclosures in the present application. In an exemplary embodiment, the predetermined threshold may relate to a defined limit that is based on a preference such as, for example, an administrator preference relating to a business guideline. The administrator may interact with a corresponding graphical user interface to define the predetermined threshold based on a business guideline. For example, to tune system performance and availability concerns against network and storage costs, the administrator may indicate that the predetermined threshold is eighty percent.

In another exemplary embodiment, the predetermined threshold may relate to a dynamically defined limit. The dynamically defined limit may be automatically adjusted in real-time based on business guidelines and current operating conditions. A data model such as, for example, a machine learning model may be used to dynamically define the limit consistent with disclosures in the present application. For example, the dynamically defined limit may fluctuate during the course of a week to account for changing bandwidth and storage costs according to a predetermined local data storage budget.

At step S408, raw data that corresponds to the user may be identified from a platform. The raw data may relate to unprocessed data that relates to the user. For example, the raw data may include account information that may be requested by the user after log in. In an exemplary embodiment, the raw data may be retrieved from a variety of client interaction platforms. The raw data may be processed into a compatible data format prior to retrieval. Similarly, the raw data may be processed into a compatible data format after retrieval. For example, the raw data may be identified from a user profile and extracted for processing consistent with disclosures in the present application. As will be appreciated by a person of ordinary skill in the art, the processing of the raw data into a compatible data format enables system agnostic integration of the claimed invention with a variety of platforms.

At step S410, a structured data set for the user may be generated from the raw data based on the corresponding user characteristic. In an exemplary embodiment, generating the structured data set may include identifying a preferred data format for the user by using the corresponding user characteristic. The preferred data format may relate to a device of the user. For example, the preferred data format may include a mobile data format that is ready for display on a mobile device of the user. A data element in the raw data may be identified and mapped to the preferred data format. Then, the structured data set may be generated based on a result of the mapping. For example, to structure the data set, additional hypertext markup language (HTML) tags may be included. Similarly, the raw data may be truncated to structure the data set for presentment in a mobile device. As will be appreciated by a person of ordinary skill in the art, performance improvements at a client application may be realized when the structured data set is in a preferred data format that is ready for rendering on the user device with minimal transformations.

At step S412, the structured data set may be persisted in an edge computing repository based on a result of the comparing. The edge computing repository may correspond to the determined geographical location. In an exemplary embodiment, the edge computing repository may relate to a storage device in a distributed computing paradigm that brings computation and data storage closer to the user. The short distance between computational resources and the user may improve response time and save bandwidth. In another exemplary embodiment, the edge computing repository may be located in a geographical location that is closest to the user based on the determined user characteristic. For example, when the determined user characteristic indicates that the user in on the west coast, the edge computing repository may relate to a networked storage device that is located on the west coast.

In another exemplary embodiment, the structured data set may be persisted in the edge computing repository when the user characteristic is greater than the predetermined threshold. Consistent with disclosures in the present application, the probability value in the user characteristic may be compared to the predetermined threshold. A probability value that is greater than or equal to the predetermined threshold may indicate a likelihood that the user will require the structured data. As such, the structured data set may be persisted in the edge computing repository to facilitate local access of the structured data set by the user. As will be appreciated by a person of ordinary skill in the art, local access of the structured data set improves system performance and decreases bandwidth usage.

In another exemplary embodiment, the structured data set may be removed from the edge computing repository when the user characteristic is less than the predetermined threshold. Consistent with disclosures in the present application, the probability value in the user characteristic may be compared to the predetermined threshold. A probability value that is less than the predetermined threshold may indicate that the user is not likely to require the structured data. As such, the structured data set may be removed from the edge computing repository to make available corresponding computing resources such as, for example, local data storage resources. As will be appreciated by a person of ordinary skill in the art, making available computing resources that are no longer needed saves unnecessary costs related to data storage and bandwidth.

In another exemplary embodiment, to request the structured data set, the user may invoke an edge service application programming interface (API). The user may invoke the edge service API by initiating a communication session such as, for example, initiating a log in to view account information. In another exemplary embodiment, the request may include data such as, for example, time data and geographical location data that relates to the communication session. The corresponding structured data set may be identified in the edge computing repository based on information in the request. Then, the corresponding structured data set may be provided to the user from the edge computing repository in response to the request. In another exemplary embodiment, the audit information may be updated with data that relates to the request. The audit information may be updated with each subsequent requests made by the user to initiate a communication session.

Figure 5:
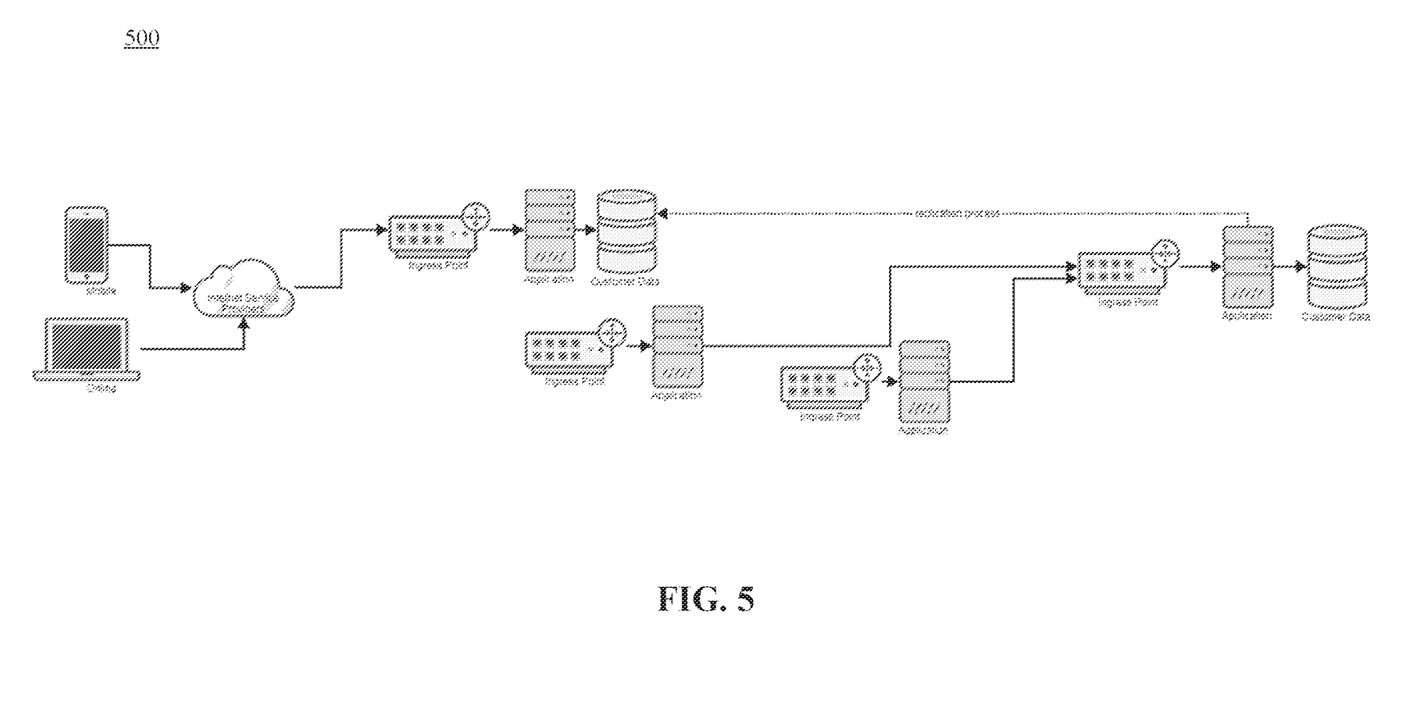
FIG. 5 is an architecture diagram of an exemplary process for implementing a method for pre-positioning user data at edge computing repositories based on predicted user access patterns.

FIG. 5 is an architecture diagram 500 of an exemplary process for implementing a method for pre-positioning user data at edge computing repositories based on predicted user access patterns. In FIG. 5, the architectural diagram relates to a computing pattern that balances the performance and operational costs of web-based, client interaction platforms by moving user data closer to where the user data is needed based on a user's last accessed location and last accessed information. As illustrated in FIG. 5, ingress points and applications closest to centralized user data storage may connect directly with the centralized user data storage to retrieve necessary information. The centralized storage of user data saves on data storage costs.

Consistent with disclosures in the present application, remote users utilizing mobile and browser-based applications to access local ingress points may retrieve necessary information from a local edge computing repository. In an exemplary embodiment, an algorithm may be developed that determines where user data should be located and when it should be placed in that geographical location. The algorithm may utilize user information such as, for example, a date the user last signed into a site and the location of where the user logged in from to perform the calculation. For example, for every network ingress location, a number of times the user has logged in at least once a day over a set number of days may be used to calculate a probability that the user will log in the following day. The algorithm may be modified to account for information such as, for example, pay day information, holiday information, weekend information, and account information.

Based on a collection of the user information over time, a calculation may be made to determine the odds of the user logging in from that location within a time period such as, for example, the next twenty-four to forty-eight hours. When the probability of the user logging in from a location are greater than a determined threshold, the necessary information may be pushed to that location to improve user experience. When the probability of the user logging in from a location is less than a determined threshold, the necessary information may be deleted from that location to improve operational costs.

Figure 6:
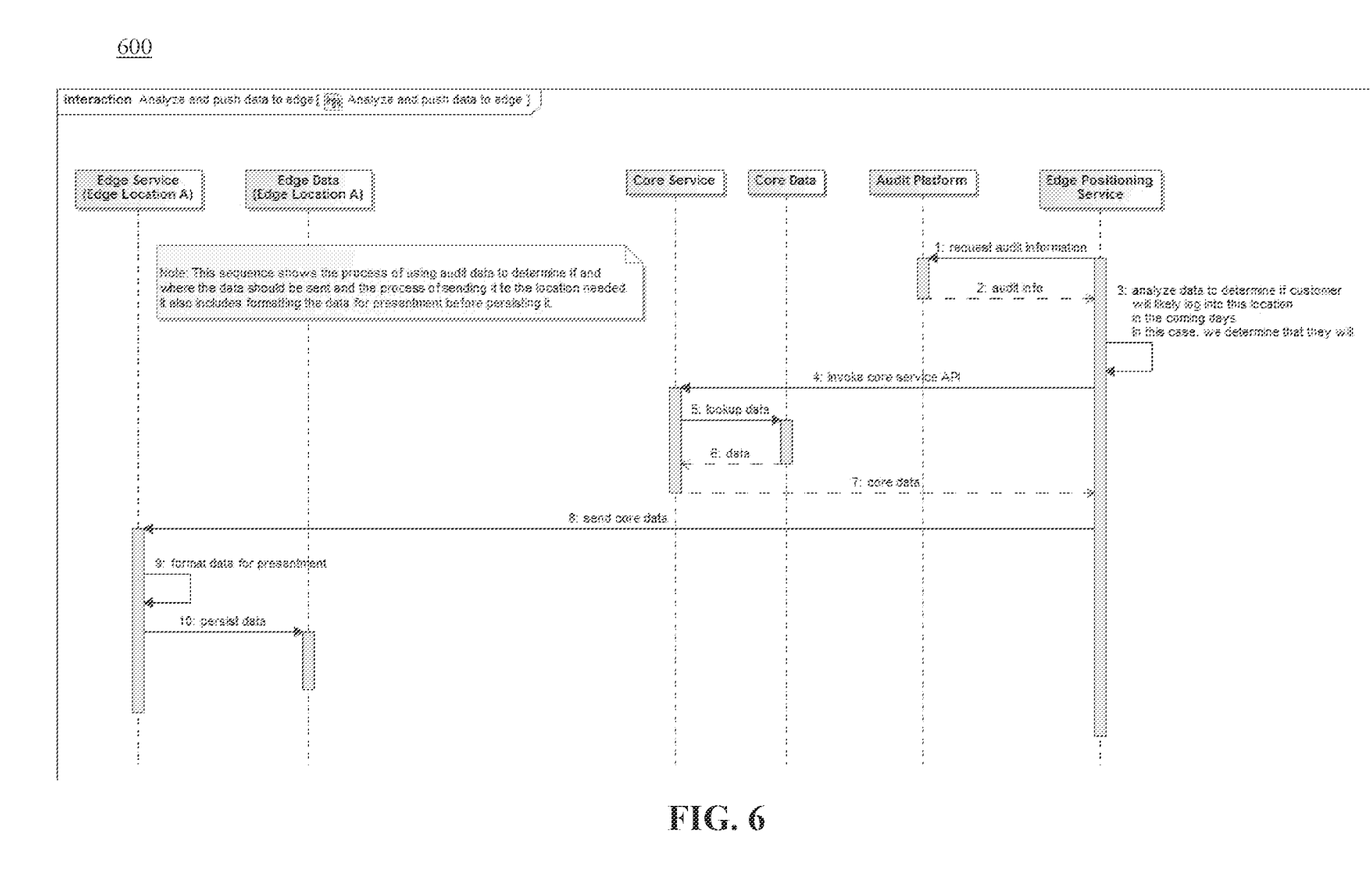
FIG. 6 is a workflow diagram of an exemplary data analyze and push process for implementing a method for pre-positioning user data at edge computing repositories based on predicted user access patterns.

FIG. 6 is a workflow diagram 600 of an exemplary data analyze and push process for implementing a method for pre-positioning user data at edge computing repositories based on predicted user access patterns. In FIG. 6, the workflow diagram shows the process of using audit data to determine whether user data should be sent to an edge computing repository and which edge computing repository the user data should be sent to. Additionally, the workflow diagram shows the process of sending the user data to the appropriate edge computing repository.

As illustrated in FIG. 6, an edge positioning service may request audit information for a user from an audit platform, which returns the requested audit information to the edge positioning service. The edge positioning service may analyze the audit information to determine whether the user will likely log into this location in the coming days. When it is determined that the user will likely log into this location in the coming days, the edge positioning service may invoke a core service application programming interface (API). The core service may identify necessary data from a core data storage repository and return the necessary data to the edge positioning service.

When the necessary data is received by the edge positioning service, the edge positioning service may send the necessary data to an edge service at a corresponding edge location. The edge service may format the necessary data for presentment consistent with disclosures in the present application. The formatted data may then be persisted in an edge computing repository corresponding to the edge service. The edge service may format the necessary data for presentment to further improve the performance of the client application. The formatted data may be rendered on the client device with minimal transformations. For example, the edge service may format the necessary data by adding hypertext markup language (HTML) tags as well as truncating the necessary data for presentment in a mobile device.

Figure 7:
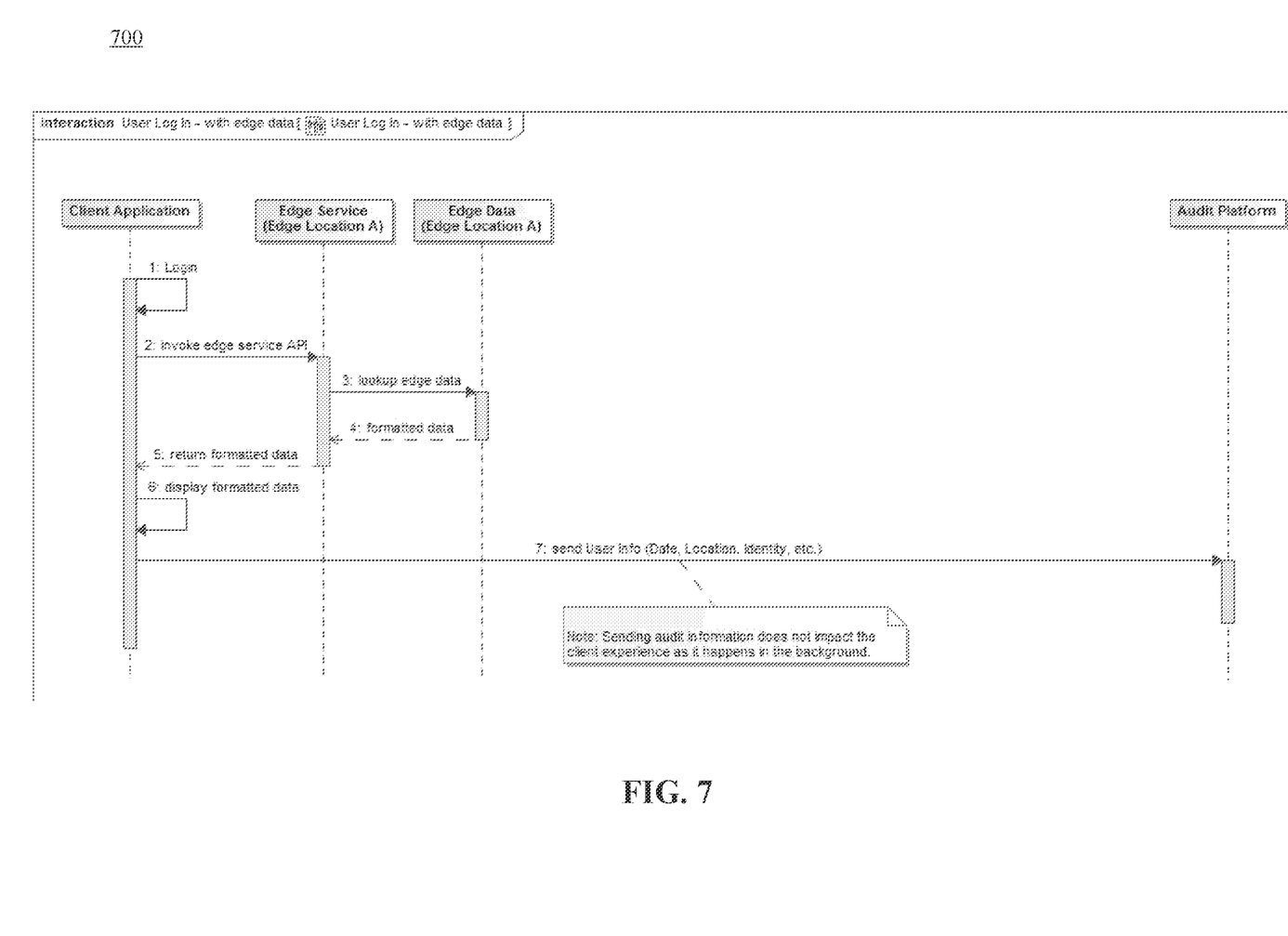
FIG. 7 is a workflow diagram of an exemplary log in process for implementing a method for pre-positioning user data at edge computing repositories based on predicted user access patterns.

FIG. 7 is a workflow diagram 700 of an exemplary log in process for implementing a method for pre-positioning user data at edge computing repositories based on predicted user access patterns. In FIG. 7, the workflow diagram shows a user log in process with available edge data.

As illustrated in FIG. 7, the client application may initiate a log in process, which invokes an edge service application programming interface (API). The local edge service may identify necessary user data from a local edge computing repository. The local edge computing repository may return the necessary user data to the edge service, which returns the necessary user data to the client application for display. Consistent with disclosures in the present application, the necessary user data may include preprocessed data that have previously been formatted for presentment by the client application. Then, the client application may send user information such as, for example, an access date, an access location, and a user identity to an audit platform to update corresponding audit information. As will be appreciated by a person of ordinary skill in the art, transmitting audit information to the audit platform may be accomplished in the background to prevent impacting user experience.

Accordingly, with this technology, an optimized process for pre-positioning user data at edge computing repositories based on predicted user access patterns is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for pre-positioning data based on at least one user attribute, the method being implemented by at least one processor, the method comprising:

retrieving, by the at least one processor, audit information that corresponds to at least one user, the audit information including the at least one user attribute;

extracting, by the at least one processor, historical data from the audit information,
wherein the historical data includes information that indicates that the at least one user frequently initiates a first communication session to check an account balance on a day on which the user is paid, and
wherein the historical data further includes information that relates to at least one from among holiday information, day of the week information, and account creation information;

determining, by the at least one processor using at least one model, at least one user characteristic for each of the at least one user based on the audit information, the at least one user characteristic including a probability value and a geographical location, wherein the probability value corresponds to a likelihood that the at least one user will initiate a second communication session from the geographical location, the second communication session relating to an interactive information interchange between at least two communicating devices;

comparing, by the at least one processor, the at least one user characteristic with at least one predetermined threshold;

identifying, by the at least one processor, raw data from at least one platform, the raw data corresponding to the at least one user;

identifying, by the at least one processor, a preferred data format for the at least one user by using the at least one user characteristic, the preferred data format relating to a device of the at least one user;

generating, by the at least one processor from the raw data, a structured data set for each of the at least one user based on the at least one user characteristic; and persisting, by the at least one processor, the structured data set in an edge computing repository based on a result of the comparing, the edge computing repository corresponding to the geographical location.

2. The method of claim 1, wherein the at least one user attribute includes information that relates to at least one from among a user geographical location and a user access time, the user access time relating to a user activity history for a predetermined period.

3. The method of claim 1, further comprising:
receiving, by the at least one processor via an application programming interface, at least one request from the at least one user;
identifying, by the at least one processor, the corresponding structured data set in the edge computing repository based on the at least one request;
providing, by the at least one processor to the at least one user, the corresponding structured data set in response to the at least one request; and
updating, by the at least one processor, the audit information with data that relates to the at least one request.

4. The method of claim 1, wherein determining the at least one user characteristic further comprises:
determining, by the at least one processor using the at least one model, a predicted access pattern for each of the at least one user based on the historical data;
determining, by the at least one processor, the probability value for each of the at least one user based on the corresponding predicted access pattern; and
determining, by the at least one processor, the geographical location for each of the at least one user based on the corresponding predicted access pattern.

5. The method of claim 1, wherein generating the structured data set further comprises:
mapping, by the at least one processor, at least one data element in the raw data to the preferred data format; and
generating, by the at least one processor, the structured data set based on a result of the mapping.

6. The method of claim 1, wherein the structured data set is persisted in the edge computing repository when the at least one user characteristic is greater than the at least one predetermined threshold.

7. The method of claim 1, wherein the structured data set is removed from the edge computing repository when the at least one user characteristic is less than the at least one predetermined threshold.

8. The method of claim 1, wherein the at least one model includes at least one from among a machine learning model, a statistical model, a mathematical model, a process model, and a data model.

9. The method of claim 1, wherein the comparing facilitates active control of positioning of the structured data set.

10. A computing device configured to implement an execution of a method for pre-positioning data based on at least one user attribute, the computing device comprising:
a processor;
a memory; and
a communication interface coupled to each of the processor and the memory,
wherein the processor is configured to:
retrieve audit information that corresponds to at least one user, the audit information including the at least one user attribute;
extract historical data from the audit information, wherein the historical data includes information that the at least one user frequently initiates a first communication session to check an account balance on a day on which the user is paid, and wherein the historical data further includes information that relates to at least one from among holiday information, day of the week information, and account creation information;
determine, by using at least one model, at least one user characteristic for each of the at least one user based on the audit information, the at least one user characteristic including a probability value and a geographical location, wherein the probability value corresponds to a likelihood that the at least one user will initiate a second communication session from the geographical location, the second communication session relating to an interactive information interchange between at least two communicating devices;
compare the at least one user characteristic with at least one predetermined threshold;
identify raw data from at least one platform, the raw data corresponding to the at least one user;
identify a preferred data format for the at least one user by using the at least one user characteristic, the preferred data format relating to a device of the at least one user;
generate, from the raw data, a structured data set for each of the at least one user based on the at least one user characteristic; and
persist the structured data set in an edge computing repository based on a result of the comparing, the edge computing repository corresponding to the geographical location.

11. The computing device of claim 10, wherein the at least one user attribute includes information that relates to at least one from among a user geographical location and a user access time, the user access time relating to a user activity history for a predetermined period.

12. The computing device of claim 10, wherein the processor is further configured to:
receive, via an application programming interface, at least one request from the at least one user;
identify the corresponding structured data set in the edge computing repository based on the at least one request;
provide, to the at least one user, the corresponding structured data set in response to the at least one request; and
update the audit information with data that relates to the at least one request.

13. The computing device of claim 10, wherein, to determine the at least one user characteristic, the processor is further configured to:
determine, by using the at least one model, a predicted access pattern for each of the at least one user based on the historical data;
determine the probability value for each of the at least one user based on the corresponding predicted access pattern; and
determine the geographical location for each of the at least one user based on the corresponding predicted access pattern.

14. The computing device of claim 10, wherein, to generate the structured data set, the processor is further configured to:
map at least one data element in the raw data to the preferred data format; and
generate the structured data set based on a result of the mapping.

15. The computing device of claim 10, wherein the processor is further configured to persist the structured data set in the edge computing repository when the at least one user characteristic is greater than the at least one predetermined threshold.

16. The computing device of claim 10, wherein the processor is further configured to remove the structured data set from the edge computing repository when the at least one user characteristic is less than the at least one predetermined threshold.

17. The computing device of claim 10, wherein the at least one model includes at least one from among a machine learning model, a statistical model, a mathematical model, a process model, and a data model.

18. The computing device of claim 10, wherein the comparing facilitates active control of positioning of the structured data set.

* * * * *